United States Patent
Canini et al.

(10) Patent No.: US 8,943,354 B2
(45) Date of Patent: Jan. 27, 2015

(54) METHOD AND DEVICE FOR PREDICTING FAULTS IN AN IT SYSTEM

(71) Applicant: Ecole Polytechnique Federale de Lausanne EPFL, Lausanne (CH)

(72) Inventors: Marco Canini, Berlin (DE); Olivier Crameri, St-Prex (CH); Kumar Gautam, Berkeley, CA (US); Vojin Jovanovic, Lausanne (CH); Dejan Kostic, Madrid (ES); Dejan Novakovic, Lausanne (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 213 days.

(21) Appl. No.: 13/671,322

(22) Filed: Nov. 7, 2012

(65) Prior Publication Data
US 2013/0124921 A1    May 16, 2013

Related U.S. Application Data

(63) Continuation of application No. PCT/EP2011/062031, filed on Jul. 14, 2011.

(30) Foreign Application Priority Data

Jul. 28, 2010 (EP) ..................... 10171147

(51) Int. Cl.
    *G06F 11/00*    (2006.01)
    *G06F 11/36*    (2006.01)
(52) U.S. Cl.
    CPC ............ *G06F 11/006* (2013.01); *G06F 11/008* (2013.01); *G06F 11/3688* (2013.01)
    USPC ......................................... 714/4.1

(58) Field of Classification Search
    CPC ....................................... G06F 17/504
    See application file for complete search history.

(56) References Cited

U.S. PATENT DOCUMENTS

| | | | | |
|---|---|---|---|---|
| 7,124,369 B2 * | 10/2006 | Beaudoin | ...................... | 715/738 |
| 7,536,602 B2 * | 5/2009 | Dams | .......................... | 714/38.1 |
| 2003/0184599 A1 * | 10/2003 | Beaudoin | ...................... | 345/853 |
| 2007/0220346 A1 * | 9/2007 | Dams | .............................. | 714/38 |
| 2008/0072190 A1 * | 3/2008 | Jain et al. | .......................... | 716/5 |
| 2009/0125976 A1 | 5/2009 | Wassermann et al. | | |

(Continued)

OTHER PUBLICATIONS

M. Yabandeh et al., "CrystalBall: Predicting and Preventing Inconsistencies in Deployed Distributed System," 6th USENIX Symposium on Networked Systems Design Implementation, Apr. 1, 2009, 229-244.

(Continued)

*Primary Examiner* — Christopher McCarthy
(74) *Attorney, Agent, or Firm* — Blank Rome LLP

(57) ABSTRACT

A method and device for predicting faults in a distributed heterogeneous IT system (100), the method comprising: creating a local checkpoint (19) in an explorer node (10) of said system (100), said local checkpoint (19) reflecting the state of said explorer node (10); running a path exploration engine (14) on said local checkpoint (19) in order to predict faults, wherein a plurality of possible inputs (71) are used by said exploration engine (14) in order to explore different paths, wherein path exploration comprises sending messages to remote client nodes (20), and receiving messages from said remote clients (20); wherein said received messages do not reveal checkpoints of said other nodes, so as to avoid leakage of any confidential information.

17 Claims, 5 Drawing Sheets

(56) References Cited

U.S. PATENT DOCUMENTS

2012/0278059 A1* 11/2012 Benjamin et al. ............... 703/22
2013/0283236 A1* 10/2013 Kuznetsov et al. ........... 717/124

OTHER PUBLICATIONS

J. Yang et al., "MODIST: Transparent Model Checking of Unmodified Distributed Systems," 6th USENIX Symposium on Networked Systems Design and Implementation, May 14, 2009, pp. 213-228.

* cited by examiner

METHOD AND DEVICE FOR PREDICTING FAULTS IN AN IT SYSTEM

This application is a continuation of International Patent Application PCT/EP2011/062031 (WO 2012013509) filed on Jul. 14, 2011, claiming convention priority of European Patent Application No. 10171147.1, filed Jul. 28, 2010, the contents whereof are hereby incorporated by reference.

FIELD OF THE INVENTION

The present invention concerns methods for predicting faults in a distributed heterogeneous IT system which avoids leakage of confidential information and to a corresponding device and appliance.

DESCRIPTION OF RELATED ART

Making distributed systems reliable is notoriously difficult. It is even more difficult to achieve high reliability for federated and heterogeneous systems, i.e., those that are operated by multiple administrative entities and have numerous inter-operable implementations. A prime example of such a system is the Internet's inter-domain routing, today based on Border Gateway Protocol (BGP). The Internet's inter-domain routing system governed by BGP is a prime example of a heterogeneous and federated system. Other such systems include DNS, electronic mail, peer-to-peer content distribution, content and resource peering, computing grids, and Web services. However, the resulting competing environment of mutually mistrusting providers fosters a tension between a provider's own goals versus the common overarching desire of keeping the federated system functioning properly.

In such an environment, making distributed systems reliable does not stop with the already difficult task of producing a robust design and implementation. Achieving high reliability also bears the difficulties in deploying and operating these systems whose aggregate behaviour is the result of inter-leaved actions of multiple system nodes running in a heterogeneous and failure-prone environment. In fact, several factors such as subtle differences in the details of inter-operable implementations, or system-wide conflicts due to locally admissible (mis)configurations can cause harmful node inter-actions that lead to faults, i.e., deviations of system components from their expected behaviour. These faults which span the state and configuration across multiple nodes are perhaps less frequent than single-machine bugs, e.g., memory-related issues. However, when these faults manifest themselves they have far-reaching and substantial negative impact, and require considerable resources to be diagnosed and eliminated.

For example, a BGP router can rightfully decide to reset its peering session in response to a syntactically valid, but semantically ambiguous message. However, when many of such routers are coupled with another large number of routers that propagate the ambiguous message (because of a different message parser implementation), the overall effect is a large fraction of routers that are continuously resetting and restoring sessions as it happened in several episodes. The resulting high update processing rate causes a performance and reliability problem. Others have argued that a malformed packet could take down a significant fraction of the Internet. Even with a message which is fully protocol-compliant, such an incident can occur.

Other large-scale systems of similar nature exist. For example, the BitTorrent content distribution system accommodates hundreds of thousands of clients that are running different implementations of the same wire protocol. Also, this system is designed to operate with little trust which resembles the federated model of loosely cooperating, separate administrative domains. Given the importance of ubiquitous Internet connectivity, it is paramount for routing protocols to be error free. However, existing multiple routing platforms have substantial reliability problems. As routing changes quickly reach every Internet domain, erroneous, malicious, or misconfigured routing advertisements have detrimental effect. Further, the fact that a majority of the deployed routers comes from only a handful of vendors makes a large fraction of the Internet susceptible to a single programming error.

The nature of distributed systems, in which the aggregate behaviour is the result of interleaved actions of multiple nodes, makes it impossible to check and debug their code in isolation. For example, FIG. 1 shows a distributed system 1 in which a BGP session reset is triggered in response to a syntactically valid, but semantically useless update message (hereafter called confusing message), so as to handle faults generated in a single node $3a$. However, when BGP session reset is coupled with a large number of nodes $3b$-$e$ that propagate the confusing message (because they do not process the confusing message in sufficient detail), the overall effect is a large fraction of the nodes $3j$-$f$ continuously reset and restore sessions 5. Nodes $3o$-$k$ end up being unreachable nodes and do not receive the potential fault. The resulting high update processing rate, which is reminiscent of emergent behaviour, causes a performance and reliability problem. A malicious packet could be engineered in a similar fashion to take down a large fraction of the Internet.

The most recent works on bug finding in distributed systems use model checking or symbolic execution to explore a large number of potential states encountered by a set of nodes. These tools are effective in finding bugs prior to deployment or even while the system is running. However, these works require that: (1) the source code of every node is locally available, and (2) the current state and the configuration files of each node can be easily obtained. Thus, these works are not suitable for use when the source code of every node is not locally available, or when the current state and the configuration files of each node cannot be obtained.

Online prediction and avoidance of large number of fault classes for BGP has been an elusive problem. Often post analysis of faults is carried out; while very useful in understanding what went wrong, such diagnosis does not prevent catastrophic events.

Using a shadow network across a set of nodes can help discover problems with node configurations, but cannot anticipate faults due to unexpected inputs or operator mistakes.

The existing methods of detecting faults on reliable routers uses modular redundancy techniques to run multiple router implementations in parallel, and leverages voting. While successful in masking a number of faults, this approach lacks the spatial awareness required to assess the impact of errors that spread across the Internet.

The federated nature of many deployed systems means that a node cannot gain unrestricted access to other nodes' state and configuration.

Furthermore, careful management of information flowing between system participants is required to preserve their confidential nature.

The heterogeneity of distributed systems makes it difficult or impossible to have local access to the source or binary code of other participants. Systematically exploring node behaviour even for a single node easily runs into the problem of exponential explosion in the number of code paths that need to be explored. Finally, the sheer size of the distributed system can pose scalability problems.

Static analysis of configuration files cannot be applied to this problem because it does not take into account the actual state and software of the system. Tools for predicting inconsistencies using live model checking cannot be used because they require a node to (1) retrieve checkpoints (with private state and configuration) from other participants, and (2) obtain access to the source code of other participants. Applying systematic source code exploration tools based on symbolic execution from initial state cannot explore code paths sufficiently deep due to exponential growth in the number of possible paths caused by having large inputs (configuration and messages received over a long time).

It is an aim of the present invention to mitigate or obviate one or more of the above-mentioned disadvantages.

BRIEF SUMMARY OF THE INVENTION

According to the invention, these aims are achieved by a method for predicting faults in a distributed heterogeneous IT system, the method comprising:

creating a local checkpoint in an explorer node of said system, said local checkpoint reflecting the state of said explorer node;

running a path exploration engine on said local checkpoint in order to predict faults, wherein a plurality of possible inputs are used by said exploration engine in order to explore different paths, wherein path exploration comprises sending messages to remote client nodes, and receiving messages from said remote clients;

wherein said received messages do not reveal checkpoints of said other nodes, so as to avoid leakage of any confidential information.

The method may further comprise creating a shadow snapshot comprising a collection of checkpoints of multiple nodes (one checkpoint per node) that are consistent with each other.

The method may further comprise creating a cloned snapshot from said shadow snapshot, and wherein said path exploration is performed by resuming execution in the cloned snapshot.

The received messages maybe based on the local exploration of execution paths starting from client checkpoints.

Every node can act as an explorer node.

A plurality of said nodes may be successively used as explorer node.

The path exploration may be executed and communicated with other nodes in isolation from the running environment of said explorer node, so that the fault prediction does not impact the running operation of said explorer node.

The method may further comprise a step of successively providing various sets of inputs to said path exploration engine and exploring paths generated by the various sets of inputs.

A concolic approach may be used for generating concrete inputs used for exploring paths. Concolic execution is a variant of symbolic execution that, instead of strictly operating on symbolic inputs, executes the code with concrete inputs while still collecting constraints along code paths. (Symbolic execution is an automated testing technique that executes a program by treating the inputs to the program as symbolic. Upon encountering a branch that involves symbolic values, the symbolic execution engine creates the constraints that correspond to both sides of the branch, and schedules execution to take place down both paths. It then queries a constraint solver to determine which paths are feasible, so that they can be explored. While symbolic execution is in theory capable of exploring all possible paths in the program, in practice it is severely limited as the number of paths to explore in an application grows exponentially with the size of the input and the number of branches in the code. A typical symbolic execution engine starts exploring paths from the beginning of the program and progressively explores all paths for which it can find suitable input values). To drive execution down a particular path, the concolic execution engine picks a constraint (e.g., branch predicate) and queries the constraint solver to find a concrete input value that negates the constraint. The main benefit of concolic execution is the ease in interacting with the environment (due to the use of concrete values), and less overhead during execution than the "classic" symbolic execution (e.g., only one call to the constraint solver for every branch). The present invention preferably uses oasis concolic execution/an oasis concolic execution engine as the basis for code path exploration. Oasis is a result of substantial modification of the Crest concolic execution engine. Oasis instruments C programs using CIL to be able to track at run-time the statements executed and record the constraints on symbolic inputs. Oasis handles the entire C language and supports interaction with the network and filesystem. Oasis has multiple search strategies, and it can execute multiple explorations in parallel. The default exploration strategy, which is preferably used, attempts to cover all execution paths reachable by the set of controlled symbolic inputs.

A grammar-based fuzzing approach may be used for generating random inputs to said path exploration engine. Fuzzing is a technique for generating random inputs that are fed to the application under test. Although very useful to subjecting the code to unexpected inputs, the random nature of input selection makes it difficult to traverse certain code paths (e.g., when a branch predicate requires a variable to be of certain value), and achieve large path coverage. Whitebox fuzzing mitigates this problem by examining the constraints encountered during symbolic execution to guide input creation. A recent variant of whitebox fuzzing leverages the input grammar to further speed up path exploration by producing a large number of inputs that quickly pass validation checks. Any suitable type of fuzzing may be used in the present invention.

A grammar-based fuzzing approach may be used for generating random inputs for exploring paths.

The number of possible node states that are explored may be limited in order to reduce computing time, using a heuristic which biases state space exploration toward states that are more likely to expose faults.

The method may further comprise the steps of:

said explorer node sends a checkpoint message to its neighbor nodes, each of said neighbor node takes a checkpoint and forwards a checkpoint message further on to their neighbor nodes, etc until a desired coverage is reached. Coverage includes scope of the heterogeneous IT system.

The state exploration may start from a checkpoint corresponding to the current live state of said explorer node.

A secure multi-party computation (SMPC) may be used for predicting faults based on different snapshots in different nodes, while avoiding leakage of confidential information.

Fault prediction may comprise detection of programming errors in devices.

Fault prediction may comprise detection of faults due to local misconfigurations of devices.

Fault prediction may comprise detection of system-wide misconfigurations.

The method may be used for a border gateway protocol.

According to a further aspect of the present invention there is provided a method for predicting faults in a distributed heterogeneous IT system, the method comprising:

creating a shadow snapshot of said system, said shadow snapshot comprising one local checkpoint in an explorer node and at least one client checkpoint in at least one remote client node, each checkpoint reflecting the state of the corresponding node;

running a path exploration engine based on said local checkpoint of said shadow snapshot in order to predict faults, wherein a plurality of possible inputs are used by said exploration engine in order to explore different paths;

wherein path exploration comprises sending messages from said explorer node to at least one receiving client node, generating a new predicted state in said client node based on said message and on a client checkpoint of said client node, and sending a reply message from said client node to said explorer node, wherein said reply message depends on said predicted state and does not reveal the client checkpoint of said client node.

A method for predicting faults in a distributed heterogeneous IT system, the method comprising:

creating a shadow snapshot of said system, said shadow snapshot comprising one local checkpoint in an explorer node and at least one client checkpoint in at least one remote client node, each checkpoint reflecting the state of the corresponding node;

creating a cloned snapshot of said shadow snapshot, said cloned snapshot comprising one cloned checkpoint in an explorer node and at least one cloned checkpoint in at least one remote client node, wherein each cloned checkpoint is a copy of a corresponding checkpoint in the shadow snapshot;

providing one or more of the cloned checkpoints with one or more inputs;

monitoring the behavior of the cloned checkpoints as cloned checkpoints process the inputs, to determine the behavior of the system in response to said inputs.

Preferably, the shadow snapshot is isolated from the system. Preferably, the cloned snapshot is isolated from the system.

The method of the present invention achieves spatial and temporal awareness of a node and its neighbourhood. This is done by creating a shadow snapshot. Nodes create temporal awareness by systematically exploring their possible behaviour and judging the wider impact of their actions (e.g., a session reset). An explorer node first initiates systematic path exploration of its current, live state. To combat an exponentially large number of states that would have to be considered, the behaviour of message handlers that perform state transformations is explored. A combination of grammar-based fuzzing and concolic execution can be used to construct and feed inputs to a running process, and to record the encountered constraints during message processing. A path exploration engine can then negate the constraints one at a time and cause additional code paths to be systematically explored by feeding each of the newly generated messages to the explorer node. To transmit any messages that are generated during exploration, a node establishes additional, isolated connections to its neighbouring nodes. The nodes involved in exploration form a consistent, shadow snapshot of potential states that could be caused by each message originating from the explorer node. Thus, the system can predict its aggregate future behaviour across multiple nodes by checking the status of properties in the shadow snapshots. The ability to predict potential faults and assess their impact enables to guard against important classes of faults.

A message handler can be used to record the encountered constraints during message processing. A message handler may be code that runs to process a given message in a node. For example, in BGP there is a message handler for processing messages of type UPDATE, and a handler for messages of type OPEN, etc.

The method of the present invention defines a narrow interface that carries the information between different administrative domains, and reuses existing protocol messages to the extent possible for interoperability and ease of deployment. The mechanisms used for path exploration and checkpointing are lightweight and run from live state, which makes them beneficial for long-running systems and in particular, long-running, heterogeneous, federated distributed systems.

According to a further aspect of the present invention there is provided a computer program product that tangibly and durably stores program code for carrying out the steps of one of the preceding claims when said program code is executed.

According to a further aspect of the present invention there is provided a device comprising:

means for creating a local checkpoint that reflects the current state of the device;

a path exploration engine to predict faults, an input generator for injecting a plurality of possible inputs to said exploration engine in order to explore different paths, said path exploration engine being arranged for sending messages to remote client nodes of a distributed heterogeneous IT system, and for receiving messages over shadow connections that leak no confidential information from said client shadow snapshots.

Advantageously the device according to the present invention can be used for exploring system behaviour in heterogeneous, federated environments that is incrementally deployable. The device works on current state of the node, leaks little information, and can quickly predicts faults.

The device may be an appliance used in an IT network system.

The appliance may be a router.

To help it deal with Byzantine faults the present invention could benefit from schemes that ensure accountability.

According to a further aspect of the present invention there is provided an appliance comprising:

a memory space that stores a local checkpoint taken from the current state of the appliance;

an interface for receiving messages from other remote client nodes of a distributed heterogeneous IT system;

a path exploration engine arranged for predicting the future state of said appliance, taking into account said local checkpoint and said messages.

The present invention aims to harness the continuous increases in available computational power and bandwidth to improve the reliability of distributed systems. Nodes in distributed systems and their administrators are proactively working towards finding which node actions could potentially lead to faults. This task cannot be done only locally by checking the single-node behaviour, as the erroneous system state can span multiple nodes and remote node configurations are not available locally. Thus, detecting faults in the general case requires some collaboration among the nodes. The faults these actions lead to are evidence of possible future system failures which may be avoided by detecting these potential faults.

To detect faults, the present invention continuously and automatically explores the system behaviour alongside the production system, but in complete isolation from it using a system snapshot captured from the current state. That is, system-wide consequences of a large number of actions which nodes can undertake, are checked, and actions that lead to failures are detected. In practice, node actions are the result of subjecting the node's code in its current state to messages, configuration changes, failures, random choices, etc., collectively called inputs in the following. Therefore, the present invention subjects the nodes to a large number of possible inputs that systematically exercise their code paths.

Accounting for the federated nature of the system, each node autonomously explores its local actions. To exercise possible node actions, a concolic execution technique is used to produce the inputs that systematically explore all possible code paths at one node. The problem of exponential explosion of code paths is overcome by starting exploring the node behaviours from current system state, and by subjecting the node's code to small-sized inputs that affect localized parts of state-changing code. A set of lightweight node checkpoints is used to allow the single node's actions reach out to other nodes as a way to drive and explore system-wide state in isolation from the production environment.

To preserve privacy between different administrative domains, a narrow information sharing interface may be defined that enables a node to query remote nodes for relevant state checks. Faults may be detected by checking and flagging violation's of given properties that, tying together state checks over multiple system nodes, capture the desired system behaviour.

Advance warnings can be used to notify the system operator(s) about a particular misconfiguration, or to trigger automatic or semiautomatic installation of a filter against the problem caused by the software reaction to an unanticipated message.

A particular benefit of the present invention is that separate administrative entities can use the present invention by integrating only their source code with it, and without requiring access to the source code, executable, or configuration of other participants

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

There is provided a mechanism for exploring system behaviour in heterogeneous, federated environments that is incrementally deployable, works on current state, leaks little information, and quickly predicts faults.

The application of the present invention to BGP and DNS systems will be described; however it should be understood that the present invention is not limited to use with these systems, but could in fact be used with any distributed system.

The faults that the present invention detects may be a result of longstanding, hard problems. For example, the present invention does not patch particular BGP problems. Instead, the present invention enables system operators to specify the desired behaviour and learn about possible faults and their impact. Property violations may uncover several insidious misbehaviours due to harmful node interactions, the root cause of which includes configuration mistakes and programming errors.

The present invention continuously and systematically explores the behaviour of a distributed system in order to detect faulty states (those in which the system components deviate from their desired behaviour).

An application which implements the method of the present invention can be run online, alongside a deployed system, off critical execution paths.

Figure 1:
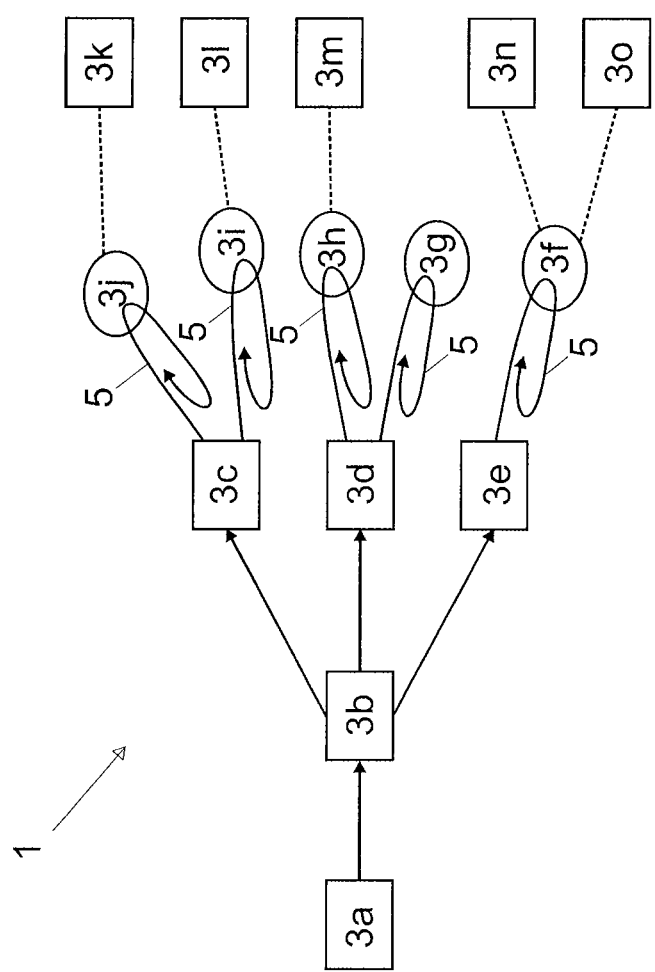
FIG. 1 shows a distributed system 1 in which a BGP session reset is carried out in response to a syntactically valid, but semantically useless update, so as to handle a perceived erroneous state from a single node's perspective.
Figure 2:
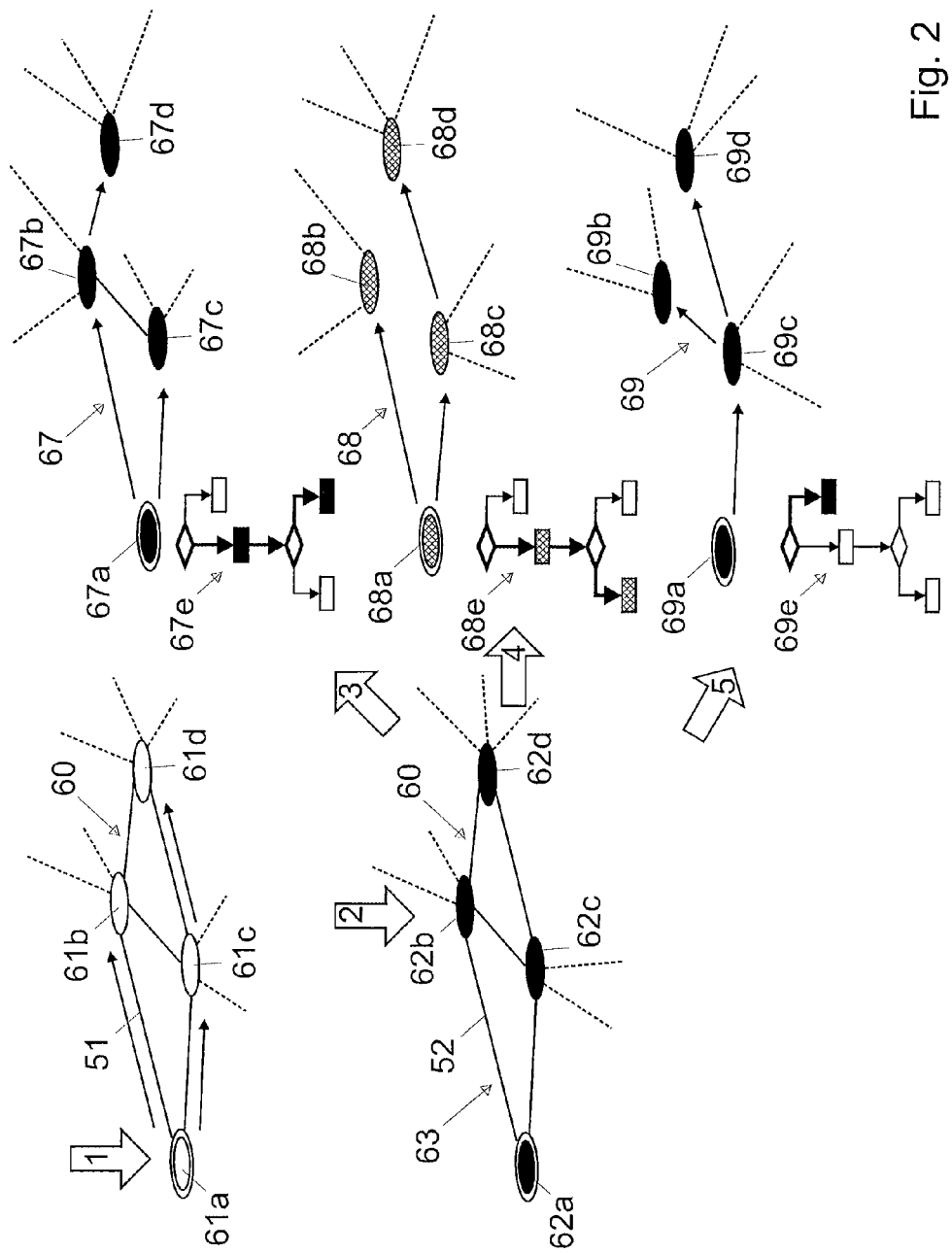
FIG. 2 provides a high-level illustration of how the method of the present invention, is implemented in distributed systems.

FIG. 2 provides a high-level illustration of how the method of the present invention is implemented in distributed systems.

In FIG. 2, there is shown a distributed system 60 comprising nodes 61a, 61b, 61c, 61d which are operably connected by communication channels 51. Only four nodes 61a, 61b, 61c, 61d are shown, however it will be understood that the distributed system 60 may have many more, or less than, four nodes 61a, 61b, 61c, 61d.

To implement the preset invention, first, a node 61a, 61b, 61c, 61d in the distributed system 60 is selected to act as an explorer 61a (Step 1).

The explorer 61a triggers the creation of a shadow snapshot 63, of the distributed system 60 (step 2). The explorer 61a establishes a snapshot 63 by sending an annotated message to its immediate neighbouring nodes 61b, 61c, which in turn forward the message further on to their neighbouring nodes (61d, and others not shown) etc. until a desired scope of the distributed system 60 has been reached.

A shadow snapshot 63 comprises a collection of node local checkpoints 62a, 62b, 62c, 62d. A node local checkpoint 62a, 62b, 62c, 62d is a saved state which represents the state of a corresponding node 61a, 61b, 61c, 61d in the distributed system 60 at the time the action of taking a shadow snapshot 63 is performed. A node local checkpoint 62a, 62b, 62c, 62d is created for each node 61a, 61b, 61c, 61d in the distributed system 60. Each node 61a, 61b, 61c, 61d in the distributed system 60 is capable of creating a node local checkpoint 62a, 62b, 62c, 62d which represents the node's state at that instant. Each node local checkpoint 62a, 62b, 62c, 62d is stored at node 61a, 61b, 61c, 61d in distributed system 60 which created it.

In this invention the each node local checkpoint 62a, 62b, 62c, 62d is stored within the corresponding node 61a, 61b, 61c, 61d which created it, and thus are referred to as 'local' checkpoints.

The node local checkpoint 62a, 62b, 62c, 62d are operably connected by shadow connections 52 (communication channels provided in the shadow snapshot 63) which are isolated from the communication channels 51 in the distributed system 60. The isolation of the shadow connections 52 from the communication channels 51 in the distributed system 60 ensures that traffic in the shadow connections 52 does not affect the distributed system 60 and therefore does not alter the state of the distributed system 60.

The shadow snapshot 63 is used to retain the original state of the distributed system 60 prior to exploration of the behaviour of the distributed system 60. The shadow snapshot 63 is disposed of when all distinct behaviours that the explorer 61a wishes to explore have been explored.

The explorer 61a then provides a plurality of different inputs to the distributed system 60 and creates cloned snapshots 67,68,69 which are copies of the shadow snapshot 63 and which represent the behaviour of nodes 61a, 61b, 61c, 61d in the distribution system 60, in response to the inputs, at various instances (steps 3-5). Each cloned snapshots 67,68,69 comprises cloned checkpoints 67a-d,68a-d,69a-d which are a copy of the local checkpoints 62a, 62b, 62c, 62d in the shadow snapshot 63. The cloned snapshots 67, 68, 69 are used to explore the behaviour of the distributed system 60. Such is achieved in the following manner:

Each input is received by one or more of the cloned checkpoints 67a-d,68a-d,69a-d in the in each cloned snapshots 67,68,69. Upon receiving an input, software code present at the cloned checkpoints 67a-d,68a-d,69a-d, which is a copy of the software code present at the corresponding node 61a, 61b, 61c, 61d which implements the logic running of that node 61a, 61b, 61c, 61d, will process the input. Processing of the input will cause the cloned checkpoints 67a-d,68a-d,69a-d to exercise a particular behaviour. A plurality of inputs will be received by each cloned checkpoint 67a-d,68a-d,69a-d, thus causing each cloned checkpoint 67a-d,68a-d,69a-d to exercise a plurality of behaviours. The behaviour of the cloned checkpoints 67a-d,68a-d,69a-d upon processing inputs, will reflect how the corresponding nodes 61a, 61b, 61c, 61d in the distributed system 60 would behave if they were to receive the same inputs. The overall behaviour of the cloned snapshots 67,68,69, which is dictated by the collective behaviour of the cloned checkpoints 67a-d,68a-d,69a-d, will reflect how the distributed system 60 would behave in response to the same inputs. Thus the overall state and behaviour of the distribution system 60, in response to inputs can be determined from the behaviour of the cloned snapshots 67,68,69. Advantageously, as the cloned snapshots 67,68,69 are isolated from the distribution system 60, exploration of the state and behaviour of the distribution system 60 can be achieved without changing the state and behaviour of the distribution system 60. Although only three cloned snapshots 67,68,69 are depicted in FIG. 2, it should be understood that preferably, there will be one cloned snapshot created for each input which is provided by the explorer 61a. Thus, in the particular example shown in FIG. 2, three inputs have been provided by the explorer 61a.

The software code present at each node 61a, 61b, 61c, 61d which implements the logic running of that node 61a, 61b, 61c, 61d, the original state of a node (61a, 61b, 61c, 61d), and the inputs received at a node 61a, 61b, 61c, 61d, will all determine how a node 61a, 61b, 61c, 61d in the distributed system 60 behaves in response to a received input. Thus, the present invention uses a combination of techniques to carefully construct the inputs that systematically explore node behaviour.

The explorer 61a initiates the creation of a cloned snapshot 67,68,69 at various instances. As discussed a cloned snapshot 67,68,69 is a copy of the shadow snapshot 63. A cloned snapshot 67,68,69 comprises cloned checkpoints 67a-d,68a-d,69a-d. A cloned checkpoint is a copy of a corresponding local checkpoint 62a, 62b, 62c, 62d in the shadow snapshot 63. The cloned checkpoints 67a-d,68a-d,69a-d can communicate over the shadow connections 52 which are provided in the shadow snapshot (alternatively a new set of shadow connections 52 can be created which can be used by the cloned checkpoints to communicate with one another). As the shadow connections 52 (communication channels provided in the shadow snapshot 63) are isolated from the communication channels 51 in the distributed system 60, and since communication between the cloned checkpoints takes place across these shadow connections 52, executions of the system over the cloned snapshot 67,68,69 does not change the state of the distributed system 60. For example, all messages outgoing from a cloned checkpoints 67a-d,68a-d,69a-d in the cloned snapshots 67,68,69 are intercepted and, instead of being transmitted over communication channels 51 in the distributed system 60, are sent over shadow connections 52 in the shadow snapshot 63, to the destination specified in the intercepted message. Thus, messages are sent using shadow connections 52 so that the traffic that is the result of exploratory executions does not change the state of the distributed system 60.

Preferably, a cloned snapshot 63 is created for each of the plurality of inputs which is provided to the distributed system 60 by the explorer 60. The behaviour which would be exercised at the nodes 61a, 61b, 61c, 61d as they processed the plurality of inputs, and thus the state of a node 61a, 61b, 61c, 61d and the state of the overall distributed system 60, is reflected in the behaviour of a node's corresponding cloned checkpoint 67a-d,68a-d,69a-d as the checkpoints 67a-d,68a-d,69a-d process the plurality of inputs. The execution of each node behaviour occurs in isolation, over the cloned snapshot 67,68,69. Each cloned snapshot 67,68,69 represents one instance of possible system behaviour involving multiple nodes 61a-d. The present invention may detect faults by checking for violations of given safety and/or liveness properties in each cloned snapshot 67,68,69.

Messaging between node local checkpoints 62a, 62b, 62c, 62d, while the exploration takes place over each cloned snapshot 67,68,69, is confined to the shadow connections 52.

FIG. 2 also provides a block diagrams 67e, 68e, 69e corresponding to each cloned shadow snapshot 67,68,69. Each block diagram 67e, 68e, 69e represents how software code at a node, which implements the logic running of that node 61a, 61b, 61c, 61d, may process an input received at a node 61a, 61b, 61c, 61d; thus the block diagrams represent a possible behaviour of a node 61a, 61b, 61c, 61d in response to one of a plurality of inputs provided by the explorer 61a.

Despite all the best efforts in thorough local testing and configuration checking, there is no substitute for having the ability to inspect distributed system state for potential faults. This is challenging because the federated nature of systems makes it impossible to simply retrieve state of the local checkpoints from other nodes. Moreover, it may be impossible to have the exact copy of the software running at other nodes, as the system is fundamentally heterogeneous. Finally, the entities controlling different nodes might not be willing to reveal their configurations.

Presented with these constraints, the present invention allows the nodes 61a, 61b, 61c, 61d of a distributed system 60 to keep their state, code and configuration in a local checkpoints 62a, 62b, 62c, 62d of a shadow snapshot 63. A local checkpoint 62a, 62b, 62c, 62d is created by each node (61a, 61b, 61c, 61d) and is representative of the state of the node (61a, 61b, 61c, 61d) at the time the of creation. A local checkpoint 62a, 62b, 62c, 62d will remain stored in the node 61a, 61b, 61c, 61d that creates it. The local checkpoint 62a, 62b, 62c, 62d has the ability to clone itself, to form a corresponding cloned checkpoint 67a-d,68a-d,69a-d which forms part of a cloned shadow snapshot 67,68,69. The local checkpoint 62a, 62b, 62c, 62d may resume normal operation, from state that was saved when the local checkpoint was created, after having been cloned, to communicate with other local checkpoints 62a, 62b, 62c, 62d belonging to other nodes 61a, 61b, 61c, 61d. Any node can thus explore the behaviour of a distributed system 60 starting from the state of the distributed system 60 represented by the shadows snapshot 63.

Each node in a scalable distributed system 60 typically interacts with its immediate neighbouring nodes (not shown). For good performance, these neighbouring nodes are often picked to be in close proximity (in terms of network latency). The proximity of cloned checkpoints in a cloned snapshot will be equal to the proximity of the neighbouring nodes in a distributed system. Thus, exploration across a cloned snapshot of these neighbouring nodes, should execute quickly in a limited scope.

The key step in detecting potential faults in distributed system 60 is to explore a large number of possible system behaviours. In practice, aggregate behaviour is the result of interleaved actions of multiple system nodes 61a, 61b, 61c, 61d. The present invention aims to let the system nodes 61a, 61b, 61c, 61d (and administrative domains) maintain control of how they participate in the system state exploration. The present invention allows the exploration of a single node's 61a, 61b, 61c, 61d behaviour reach out to other system nodes 61a, 61b, 61c, 61d as a way to explore system state. This kind of exploration can take place one node at a time, in parallel, or a combination thereof.

In practice, the behaviour of each node 61a, 61b, 61c, 61d in a distribution system is determined by the path taken through software code which is present at the node 61a, 61b, 61c, 61d which implements the logic running of that node 61a, 61b, 61c, 61d. A local checkpoints 62a, 62b, 62c, 62d is a saved state of this software code, saved at a particular instant in time. In the corresponding cloned checkpoints 67a-d,68a-d,69a-d execution of the software code, from a saved state reflected in the local checkpoint, after cloning, is executed. The software code that will execute next, when the cloned checkpoints 67a-d,68a-d,69a-d resume execution, is affected by (i) the current state of the node 61a, 61b, 61c, 61d and (ii) the inputs which are provided by the explorer 61a to explore node behaviour. 'Execution' refers to code execution: running a program; the checkpoint is a saved program state; resuming execution means continuing to run a program from the state saved in the checkpoint. Cloned checkpoints 67a-d,68a-d, 69a-d can run, by resuming execution from the state reflected in the local checkpoint, after cloning.

Inputs encompass a variety of sources and events: e.g., messages, configuration changes, timers. Other less explicit inputs are events such as node failures and random choices. Messages are the information exchanged between distributed system nodes 61a, 61b, 61c, 61d. The syntax and content of these messages is determined by the specific protocol design of the distributed system. Configuration changes refer to changes that alter the configuration of a distributed system node 61a, 61b, 61c, 61d and may result in a different behaviour for such node 61a, 61b, 61c, 61d. Timers refer to the fact that the implementation of a distributed system node 61a, 61b, 61c, 61d would typically associate certain software to execute when a given timer expires, e.g., 1 minute in the future. By controlling these sources, our invention can explore the effect of different events on the distributed system. It should be understood that inputs are not limited to messages, configuration changes, timers; other inputs are also possible.

Because node 61a, 61b, 61c, 61d behaviour depends on the inputs, by subjecting the cloned checkpoints 67a-d,68a-d, 69a-d to a variety of possible inputs in a way that systematically exercises the nodes code paths at the cloned checkpoints 67a-d,68a-d,69a-d, a node's 61a, 61b, 61c, 61d behaviour can be explored.

In software testing, symbolic execution is a technique that explores all possible code paths in a program. Symbolic execution treats the input variables of the program as symbolic inputs, and during execution collects the constraints that describe which input values can lead to a particular point in the code. To maintain a low execution overhead and to allow for easy interaction with the distributed system 60 a variant of symbolic execution called concolic execution may be used in the present invention. Concolic execution executes the code within a node with concrete inputs, while still collecting constraints along code paths.

Concolic execution software is provided in the present invention, in a concolic execution engine. To drive execution down a particular path, the concolic execution engine picks one constraint (e.g., branch predicate) and queries a constraint solver to choose a concrete input that negates the constraint. For a given branch in the software code (a point in the code where the software can do only one out of two possible actions), a constraint is a collection of conditions (or branch predicates) that cumulatively describe what input values can lead to one side of the branch and what input values can lead to the other side of the branch. A constraint solver is an algorithm that attempts to find the values that satisfy a constraint. A constraint is satisfied if the assignment of its variables (the input values) gives a true result.

The explorer 61a, runs a controller, and a concolic execution engine. The controller starts by demanding the creation of a shadow snapshot. It then uses a previously encountered real input (e.g., a message) to record the constraints encountered on the code path executed with that input (e.g., by invoking a message handler).

This initial set of constraints is then passed on to the concolic engine. After completing the initial constraint recording, the concolic engine starts negating constraints one at a time, resulting in a set of inputs, each of which negates a particular constraint.

To explore a particular input, the controller instructs the explorer's local checkpoint to clone itself, and then resumes running from this cloned checkpoint. The constraints during this new execution path at the explorer node are once again recorded and fed to the concolic engine, which then updates the aggregate set of constraints and keeps producing new inputs. Updating the aggregate set is important for achieving full coverage, since the previous runs might not have reached all branches that exist in the code.

Once the exploration with a particular input completes, the cloned snapshot is checked for faults as explained in the next subsection.

Faults are detected by checking for violations of safety and liveness properties in the cloned snapshots. These properties may be user-specified. The properties will capture system-specific invariants or describe the desired distributed system 60 behaviour. Some distributed system 60 were designed with these types of properties in mind; when that is not the case, the properties can capture the best distributed system 60 practices (as is the case with a Border Gateway Protocol (BGP)).

To check properties across domains, let N be the set of nodes, and $\Theta_i$, i∈N denote the set of node's i states executing in the cloned snapshot. A property, or global check, is expressed as a function:

$$g(\Theta_1, \Theta_2, \ldots, \Theta_{\|N\|}) \in \{0,1\}.$$

Note that a global check considers system-wide behaviour and may potentially require accessing information at multiple nodes in different administrative domains. To control the information shared across domains, a narrow interface is introduced. A subfamily of global checks is considered for which:

$$g(\Theta_1, \Theta_2, \ldots, \Theta_{\|M\|}) = \{1 \text{ if } [\Sigma_{i \in N} f(\Theta_i)] > th; 0 \text{ otherwise}\},$$

where $f(\Theta_i) \in N_0$ is a check that only accesses local state and th is a property-specific threshold (e.g., 0).

In this scheme, a centralized entity (e.g., the explorer 61a) computes a global check as the sum of local check values. This may require a global check to be decomposed into local checks, thus this might require an ad-hoc distributed protocol for detecting policy conflicts.

To preserve privacy, the output of cloned checkpoints (67a-d,68a-d,69a-d) should, preferably, not contain any private information. For example, local checks can be written in the form: "was there a certain change in the node's state?"

However, there could be cases when individual domains are not willing to disclose local checks unless anonymity can be guaranteed, e.g., if a local check necessarily leaks private information. At the expense of increased computational complexity, information sharing can be controlled by securely summing local check values so that only the final outcome is known to participating nodes and single addends are not known. We now describe a proof-of-concept scheme that uses a protocol for securely summing local check values. Let D denote the set of participating domains, $N_j$ be the nodes of domain $j \in D$. We assume there exists an out-of-band mechanism for disseminating a shared public key PK and a list of private keys $SK_1, \ldots, SK_{\|D\|}$. Each domain j sends the cyphertext $E_{PK}([\Sigma_{i \in N_j} f(\Theta_i)])$ to all other domains. Next, each domain leverages the homomorphic property of the cryptosystem to compute $c = E_{PK}([\Sigma_{i \in N_j} f(\Theta_i)]) = \Pi_{j \in D} E_{PK}([\Sigma_{i \in N_j} f(\Theta_i)])$. The decryption of c is shared across all domains. Specifically, each domain j runs a decryption algorithm using $SK_j$ that produces a decryption share cj and sends it to other domains. Finally, each domain inputs $c_j$, $\forall_j$ to a combiner algorithm that outputs $\Sigma_{i \in N_j} f(\Theta_i)$. Comparing this value with the threshold th gives the global check.

Figure 3:
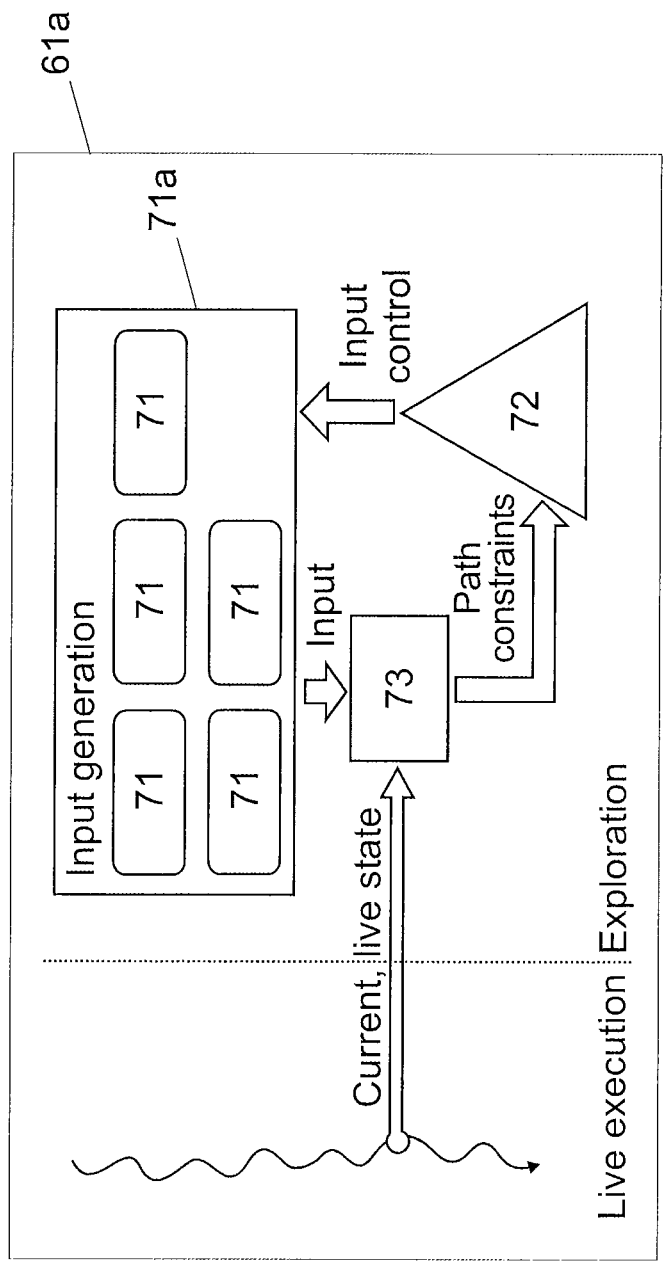
FIG. 3 is a diagram illustrating the flow of communication between a concolic execution engine, an input generation component, and the code that implements the logic of distributed system node under test, used in the implementation of the present invention.

As shown in FIG. 3, a variety of inputs 71 can be used to enable a concolic execution engine 72 to drive the explorer's 61a behaviour to reach relevant system-wide states.

FIG. 3 illustrates the flow of communication between a concolic execution engine 72, an input generation component 71a, and the code 73 that implements the logic of distributed system node 61a under test, used in the implementation of the present invention. FIG. 3 depicts a plurality of possible inputs 71 which are created by the explorer 61a to systematically exercise the paths of software code in a node's 61a, 61b, 61c, 61d within the distributed system 60, in order to explore behaviour of node's 61a, 61b, 61c, 61d in the distributed system 60.

The inputs 71 are fed to software code 73 which is present at the node 61a, 61b, 61c, 61d which implements the logic running of that node 61a, 61b, 61c, 61d. The inputs 71 exercise the software code 73 present in a node 61a, 61b, 61c, 61d in a particular manner, thus causing the node to execute a particular behaviour. The inputs 71 may comprise one or more of messages, configuration changes, timeouts, failures, random choices.

Path constraints encountered during the exercising of the software code 73 are relayed to a path exploration engine 72 of the explorer 61a.

FIG. 3 shows that the exploration takes place in parallel to the production distributed system (called 'live execution'). At some point in time, there is a snapshot created from current system state. More importantly, FIG. 3 also shows the exploration process as a cycle that includes (1) the software code 73 implementing a distributed system node, (2) the path exploration engine 72 that implements concolic execution, and (3) the 'input generation' component 71a that injects inputs 71 into the code. The exploration occurs in a cycle because path constraints are learned on a continuous basis while exploring. When there are no new path constraints, the exploration continues until all code paths are covered (not shown). The input generation explicitly shows a representation of the component that injects several inputs into the code based on certain control information provided by the path exploration engine. Specifically, the path exploration engine needs not to be explicitly concerned of all the possible inputs to the distributed system node. The input generation component is the layer of abstraction where the information about the possible inputs is available. This information is made available to the path exploration engine only in an indirect fashion through exposing a set of additional code branches. The path exploration engine is then responsible for controlling the execution through these branches that decide the specific inputs to be injected. Examples of possible inputs include application-specific messages, configuration changes, timeouts (timer expirations), (emulation of) failures, and random choices. Random choices are inputs related to the places in the distributed system software where the code makes use of a randomly generated number to decide what to do. The present invention is for example able to systematically explore with all relevant possible values of these random decisions.

Ideally, it is desired to define as symbolic any input 71 that could cause a distributed system 60 to transition from a current state to a faulty state i.e. symbolic inputs are defined. Leveraging domain knowledge is an effective approximation to identify all these inputs. For instance a key aspect of DNS name resolution is the random choice in querying one of many possible name servers for a given domain name. This driver of node behaviour is easy to recognize and, treated as symbolic input, allows to explore interesting interleaving of node actions and to capture the effects of remote node failures.

Property definitions may give hints as to what inputs 71 need to be symbolic. For example, persistent oscillations in BGP can be caused by conflicting policies at different administrative domains. Policies are encoded in router configuration. Treating a policy configuration change as symbolic input enables to exercise the BGP route selection process and find potential conflicts lurking in the configuration.

Finally, for concolic execution, as is used in the present invention, it is preferable to use grammar-based whitebox-fuzzing which leverages knowledge of the message format to produce a large number of inputs 71 that quickly pass validation checks. The present invention applies fuzzing code before the message handlers, and relies on the domain knowledge to identify these handlers. A message handler is a part of code at a node 61a, 61b, 61c, 61d. A message handler is invoked by the code running at a distributed system node 61a, 61b, 61c, 61d when the node 61a, 61b, 61c, 61d receives a message. The handler is responsible for processing the message.

In addition to a thoughtful choice of symbolic inputs, two key principles are used for dealing with the path explosion and large input problems. Firstly, the exploration is started from current system state (the shadow snapshot). Doing so eliminates the need to replay from initial state a potentially large history of inputs to reach a desired point in the code. Secondly, behaviours that are a result of small inputs, both size-wise and in number are explored. The intuition is to try to reach faulty states that are small deviations from current state rather than being more exhaustive with the associated exponential increase in states.

Ideally, the data that is crossing an 'administrative domain' i.e. a domain under the administrative control of a single entity, among the nodes 61a, 61b, 61c, 61d preferably should not reveal any confidential information. At a high level, there are two main kinds of information that can be leaked: potential node behaviour and configuration data.

Leakage of node behaviour is a direct consequence of systematic code path exploration. In a long-running distribution system 60 the behaviour has already been revealed for at least the most common set of code paths.

Configuration data can be leaked if the executed code paths produce messages containing a direct copy of the configuration data or an indirect manipulation thereof from which the configuration data can be reverse engineered.

However, using concolic execution, as is used in the present invention, aids in information hiding. When a concolic engine wants to negate a constraint, it can pick any random value that negates the constraint to drive execution. Thus, the randomized nature of these inputs limits this kind of information leakage. In addition, we can annotate what data is confidential and avoid recording constraints from the code that handles the confidential data so that it cannot leak into the inputs the concolic engine produces. Finally, additional measures can be taken, including: (1) rate limiting the exploration or responses to property checks, or (2) refusing certain explorer nodes altogether in the absence of any trust.

The application of the present invention to two federated, heterogeneous distributed systems, BGP and DNS, will now be described.

The embodiment of the present invention comprises a concolic engine, a part written in C and integrated with the target systems, and a Python implementation of a controller.

An Oasis concolic engine is used as the basis for code path exploration. Oasis instruments C programs to record constraints on symbolic inputs during program execution. Oasis concolic engine is modified to provided support for exploring from current state and the ability to use a single executable where both the original and instrumented code co-exist for avoiding performance overheads in the deployed system while recording constraints during exploration.

In addition, in this work Oasis filesystem/network is modified so that it can manage shadow connections.

The Internet consists of tens of thousands of domains, so called autonomous systems (ASes). ASes are typically administered by Internet Service Providers (ISPs). While the ASes have freedom in choosing their intra-domain routing protocol, Border Gateway Protocol (BGP) is the inter-domain routing protocol that acts to ensure universal connectivity in the Internet and is spoken at each border router.

Each BGP speaker maintains a routing table, or Routing Information Base (RIB) that associates a route to a network prefix with the next hop router and the list of ASes (AS PATH) that needs to be taken to reach a given IP in that prefix. The routing information is distilled into a Forwarding Information Base (FIB) that is used to make packet forwarding decisions. BGP speakers establish their routing tables by exchanging UPDATE messages which announce routes (each composed of a prefix and a bitmask length) along with their corresponding attributes (e.g., AS PATH) and/or withdraw routes that are no longer available. The protocol has been extended to allow for 4-byte AS numbers, and thus the messages can carry the optional AS4 PATH attribute. Legacy routers that do not understand the 4-byte AS numbers do not attempt to interpret the new attribute and simply pass it along with their updates.

For integrating the present invention in BIRD, (1) the symbolic inputs are marked (only a few lines-of-code (LoC)), (2) support for taking snapshots and managing shadow connections (about 1300 LoC), is added and (3) certain properties based on the local state that are queried by the controller are exposed in order to detect faults (about 200 LoC).

UPDATE messages and policy configuration changes are treated as the basis to derive new inputs during exploration. In BGP, UPDATE messages are the main drivers for state change while the other state changing messages are only responsible for establishing or tearing down peerings.

As the format of BGP messages is well-defined in the RFC, grammar-based fuzzing is applied to the path attributes and the Network Layer Reachability Info (NLRI) region of the message is marked as symbolic. An UPDATE message can carry several path attributes each of which is encoded as a type, length, and value field. To fuzz message attributes, two symbolic inputs for each attribute present in the initial message are created.

With respect to the fuzzed message, the meaning of attribute presence and length, are assigned to each of these inputs, respectively. Accordingly, if the Oasis concolic engine picks a non-zero value for the first input then that attribute is included, otherwise it is removed from the message; the attribute's length is matched to the second input. Therefore, the Oasis concolic engine can produce fuzzed messages based on all combinations that these symbolic inputs can have.

In addition, the Oasis concolic engine can change the content of the NLRI based on the set of recorded constraints. A further symbolic input is defined that represents changes to a route preference as it would be caused by a configuration change. Specifically, this input reflects for a given route whether that is the most preferred route or not. Thus, Oasis concolic engine can explore system behaviours for different preferences in the explorer's route selection process.

Figure 4:
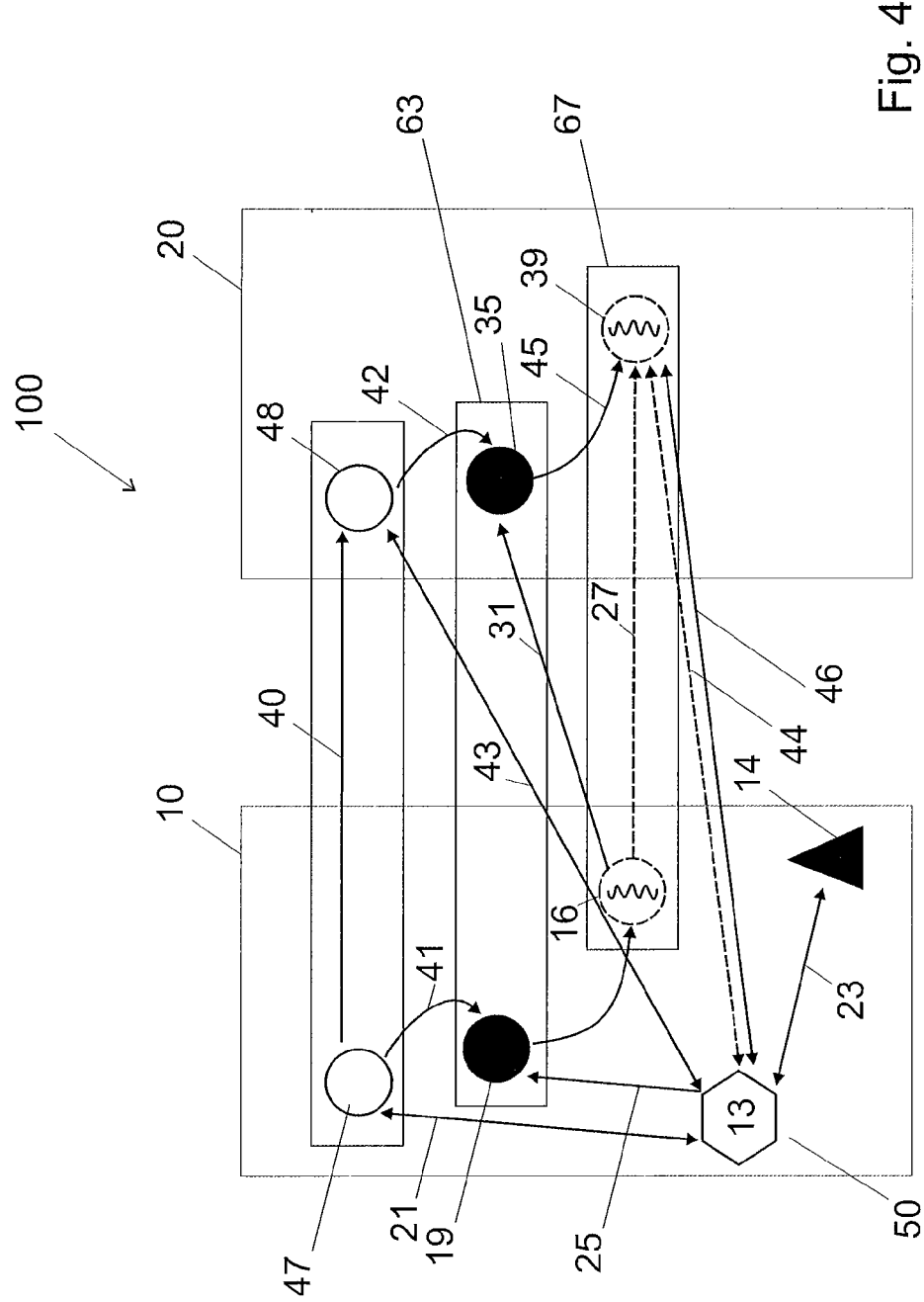
FIG. 4 shows the overview of the present invention in one round of exploration.

As shown in FIG. 4, a mechanism 50 according to the present invention can be incorporated into a long-running distributed system 100, off critical execution paths, to explore the behaviour of the distributed system 100. FIG. 4 depicts one round of exploration carried out by the present invention when implemented into a long-running BIRD distributed system 100. BIRD is an open-source implementation of several routing protocols, including BGP which is the particular example being considered in this particular embodiment. One node 10 in the BIRD distributed system 100 is selected to act as an explorer 10, while other nodes 20 (only a single other node is shown) act as client nodes 20. It will be understood that the distributed system 100 could have any number of client nodes 20 and typically will have a plurality of client nodes 20. It should be noted that any node 10,20 could act as an explorer. The explorer 10 runs a controller 13, and an Oasis path exploration engine 14.

The controller 13 in the explorer 10 initiates the exploration by sending a "create shadow snapshot" command 21 to software code 47 running in the explorer 10. This triggers a checkpointing phase which results in the creation of a shadow snapshot 63 comprising a local checkpoint 19 (step indicated by 41). In the current implementation, this is done by creating a local checkpoint 19 at the explorer 10 and sending an UPDATE message annotated with a custom path attribute to client nodes 20 in the distributed system 100 (40). Enclosed in the custom path attribute is the number of the local checkpoint 19, the IP address of the explorer 10, a counter to confine the exploration scope (the counter is decreased at each time the UPDATE message is forwarded to a node), and a weight used for termination detection (as will be explained later).

A client node 20 which receives this UPDATE message at software code 48 running in the client node 10 which interprets the custom path attribute and, if this is the first time the client node 20 has received the checkpoint number which is enclosed in the custom path attribute, then the client node 20 creates 42 a local checkpoint 35. The client node 20 sends an acknowledgement message 43 to the controller 13 of the explorer 10 after it has created the local checkpoint 35. The same is done at each client node 20 in the distributed system 100 which receives the UPDATE message. The local checkpoints 19,35 and communication channels which operably connect the local checkpoints 19,35 define a shadow snapshot 63.

As a BIRD distributed system 100 operates a single process, the procedure to create a local checkpoint is simply implemented using the fork system call. This way enables the creation of a large number of local checkpoints 19, 35 with a small memory footprint. When a local checkpoint (19, 35 is created, the mechanism 50 of the present invention operates to isolate the forked process from the live distribution system 100, by closing open sockets and marking them as shadow sockets. A network socket is an endpoint of a bidirectional inter-process communication flow across an Internet Protocol-based computer network. Also, the local checkpoint is isolated from the FIB. Finally, the mechanism 50 of the present invention opens a new socket to listen for incoming shadow connections on a different port from that used by the production instance of the BIRD distributed system 100. The new socket is used to ensure isolation of the checkpoints from the distributed system, as described earlier.

The dissemination of the UPDATE message is achieved by announcing a route to a dedicated prefix so that every client node 20 in the distributed system 100 eventually receives the UPDATE message. However, each client node 20 should preferably send an acknowledgement message to the controller 13 of the explorer 10 after it has created a local checkpoint 35. For this purpose, a variation of a weight-throwing algorithm for termination detection in a distributed system is used.

The explorer 10 starts by sending the UPDATE message with an initial weight (e.g., 1). When a client node 20 receives the UPDATE message, it keeps a part of the weight for itself (e.g., weight·1/(#neighbors+1)) and, it equally shares the remaining part of the weight among its neighbouring nodes (not shown) by propagating the UPDATE message to a corresponding number of neighbouring nodes. A client node 20 that does not propagate the UPDATE message further keeps the received weight for itself. Meanwhile, every client node 20 reports (43) its weight to the controller 13 of the explorer 10. When the reported weights sum up to the initial weight the controller 13 concludes termination of checkpointing phase and starts exploring by running the Oasis concolic engine 14.

Each client node 20 in the distribution system 100 comprises software code which implements the logic running of the node. The Oasis concolic engine 14 records the path taken through this software code at each client node 20, when processing the UPDATE message and thus records the behaviour of each of the client nodes 20. The Oasis concolic engine 14 also collects constraints which are encountered by the software code at each client node 20, as the software code processes the UPDATE message i.e. the Oasis concolic engine 14 collects constraints along the branches it encounters in the code. In the particular example shown in FIG. 3 the constraints may also come from: (1) the code for fuzzing path attributes, (2) the code for injecting policy changes, and (3) the BIRD configuration interpreter.

Note that a client node's behaviour will be influenced not only by the software code which is present at client node 20, but also by the current configuration of the client node 20. This is why the Oasis concolic engine 14 records constraints for the interpreted configuration. Therefore, the explored execution paths are comprehensive of both code and configuration.

An isolated BIRD process is then forked from the previously established local checkpoint 19 in the shadow snapshot 63. A process forked from a local checkpoint 19 in the shadow snapshot 63 at the explorer 10 creates a cloned checkpoint 16 at the explorer 10. A cloned checkpoint 16 is a copy of the local checkpoint 19 in the shadow snapshot 63, and which represent the behaviour of explorer 10 at the instant the cloned checkpoint 16 was created by the explorer 10.

Before the cloned checkpoint 16 in the explore 10 can communicate messages with a client node 20 a communication connection between the cloned checkpoint and the client node 20 is required. A communication connection 31 is established which connects the cloned checkpoint 16 to the local checkpoint 35 of the client node 20 (the client node 20 in this case is a message destination). The client node 20 subsequently creates 45 a cloned checkpoint 39. The cloned checkpoints 16,39 and the communication connection 27 therebetween, define a cloned shadow snapshot 67.

To perform path exploration, the Oasis concolic engine 14 negates each of the constraints which is has previously collected, one at a time, and transmits these negated constraints to the controller 13. The controller 13 then produces a new assignment of symbolic inputs which are provided to the distribution system 100 to drive an execution of exploration 25.

Note that only one cloned checkpoint 16,39 per client node 20 is created for execution of exploration for exploring one particular behaviour. The first connection is handled by the local checkpoints 19,35 in the shadow snapshot 63, any subsequent connection is managed by the cloned checkpoints 16,39. The first time cloned checkpoint 16 in the explorer 10 wishes to send a message to a cloned checkpoint in the client node 20, a shadow connection is established. This setup is achieved by connecting cloned checkpoint 16 to shadow checkpoint 35. Then shadow checkpoint 35 makes a clone 39 that takes hold of the shadow connection. However, if cloned checkpoint 39 already exists in the client node 20, and another client node (not shown) wants to communicate with client node 20, it will connect directly to cloned checkpoint 39. Then, messages are exchanged 27 between the cloned checkpoints 16,39. When the cloned checkpoint 39 in the client node 20 receives a first message from the cloned checkpoint 16 in the explorer 10, it ignores the previously existent information about the route(s) contained in the message. This is to ensure that messages are propagated as they would in production, because otherwise the BGP selection would ignore the announcement.

A message in this particular embodiment carries routing information. To be able to explore system behaviour in the cloned snapshot, this embodiment of the invention makes the decision to ignore certain information of the saved state (i.e. certain information in the local check point). The ignored information is about the same routes included in the BGP message. By ignoring this information, this embodiment of the invention ensures that the messages are propagated as they would in the production distributed system in case these routes were not already announced. This is because the BGP route selection algorithm decides to ignore routing information that is no different than what is already known.

The messages are extended to carry weight information so that the same termination detection algorithm described before is used to detect (46) BGP convergence in the cloned shadow snapshot (67). However, routing may not converge if BGP is in an ill-state within the snapshot 19. Therefore, during exploration, a method to prevent persistent BGP oscillation under arbitrary filtering is used. Lack of convergence due to system dynamics (session failures) are tolerated by shutting down the failed BGP session at the node at which a BGP error occurs.

When the controller 13 detects that one execution terminates, it queries 44 all client nodes 20 that participated in the exploration for properties that allow for fault detection. Then, the mechanism 50 can progress with another exploration execution based on the next negated constraint. When each execution terminates, the processes involved in the exploration can terminate also and release the resources. For example, the shadow snapshot 63 is disposed of when all distinct behaviours that the explorer 10 wishes to explore have been explored.

Exploration concludes when the Oasis concolic engine 14 has covered the paths reachable by controlling the composite set of recorded constraints. At the end of the exploration all checkpoint processes are also terminated.

To capture a system-wide snapshot of the BIRD distributed system 100, the UPDATE message preferably will propagate through the whole BIRD distributed system 100 and reach all client nodes 20 within the exploration scope. This can be easily achieved by reserving a prefix for this purpose which is announced to trigger the checkpointing and withdrawn afterwards. This does not require any modification to BGP because custom route attributes are allowed in the protocol specifications, making it possible to pass-through legacy routers.

The present invention could be deployed incrementally on BGP routers. To check for faults due to programming errors, an ISP might configure a router which comprises the mechanism 50, to send exploration messages to spare equipment which can run in isolation and be monitored for observable errors (e.g., through system logs). In addition, an ISP could check for misconfigurations by deploying a single route server which comprises the mechanism 50, configured with the ISP policy and connected with routers which comprise the mechanism 50 at neighbouring ISPs.

The differences for applying the present invention to another crucial system for the Internet infrastructure i.e. Domain Name System (DNS) will now be discussed.

DNS realizes a name resolution service for the Internet that maps host names to IP addresses. DNS is a distributed database composed of a large number of hierarchically organized, autonomously administered zones, each of which is a subspace of the global namespace that is authoritative for the names that share the same suffix with the zone's domain name. Each zone maintains a list of so called Resource Records (RRs) for the domains under the zone's authority. For example, the A records map names to IP addresses; the NS records identify authoritative name servers (ANSs).

Typically, name resolution is carried out by a DNS resolver. In the basic form, given a name, the resolver queries one of the ANSs belonging to the name's domain. If the list of ANSs is not known, the resolver needs first to retrieve it from an ANS of the parent zone. This process can repeat up to the root of the DNS hierarchy that is conveniently hard-coded in all resolvers.

For integration into DNS LoC to MaraDNS is integrated with the concolic engine, and another LoC to enable symbolic inputs. The fact that DNS servers process queries do not change their state simplifies the integration because the deployed nodes form a snapshot.

In DNS, local node actions do not result in state changes at remote nodes. In principle, therefore, a single node cannot be responsible for an event like system-wide session resets such as in BGP. However, node behaviour is not only driven by code but also by configuration. In the case of DNS, errors lurking in the system configuration are an example of a cause of misbehaviour that can be problematic for system reliability (e.g., the impossibility of resolving certain domains). In the absence of state-changing operations, subtle misconfigurations manifest themselves as the result of specific interleaving of node actions. For DNS, that is the particular path (ordering of nodes) in which a DNS resolver attempts to resolve a domain name. Note that this path is also affected by failures of DNS servers or routing instabilities.

To drive the exploration, the way the resolver decides which ANS to query when it has multiple choices is changed. A "get_server( )" function that for each ANS list, maintains a subset of active servers. Each time the resolver needs a server from that list, the function selects one from the active subset. Both the subset and the server selection are implemented using boolean symbolic inputs. This way, the concolic engine tries all the possible server subsets and all the possible server combinations. In doing so, it mimics the remote server failures that could cause different local choices, as well as the different random choices in choosing a server. In the particular example shown in FIG. 4, developer input and integration with the long-running distributed system 100 is required prior to operation of the mechanism 50. Specifically, the mechanism 50 should be made aware of the requirements of message handlers at each node 10,20 that perform state transformation, and the grammar for these message handlers. To maximize interoperability and the mechanism's deployment chances, it is preferable not to introduce new message types or change existing headers. It is typically possible to augment existing messages with: 1) a checkpoint number and hop-count limit, and 2) an acknowledgment attribute. Deployed protocols typically include a plurality of negotiable options that facilitate future changes.

The present invention can predict faults which are a subset of faults that can be detected in a general distributed system. To help it deal with this type of faults, the present invention could directly benefit from tools that ensure accountability. An important challenge in a federated environment is to limit the amount of information that is leaving each domain. The approach of concolic execution used in the present invention aids in information hiding. When the Oasis path exploration engine 14 negates a constraint, it chooses a random input that satisfies the constraint. Thus, the content of a message that is being transmitted in the shadow snapshot is merely a representative of a class of inputs that would explore the same path at the sender. To help the operator in preventing a wide range of faults (i.e., missing filters on a range of IP prefixes), the present invention can still output the full constraints locally.

It is advantageous to be able to inspect live system state for potential faults. Thus, a key challenge for fault prediction is spatial awareness, by gaining access to the state at other system nodes. This can be accomplished with ease in cooperative systems by, for example, retrieving a consistent snapshot of current state. However, such solutions are not possible for systems of a federated nature. Moreover, it is difficult or impossible to have the exact copy of the software running at other nodes, as the system is fundamentally heterogeneous. Further, the entities controlling different nodes might not be willing to reveal their configurations, which also makes it difficult to approximate a given node state by running a semantically equivalent implementation on its configuration. The present invention adopts an approach that respects the node trust boundaries by letting the nodes keep their configuration and state, as well as the amount and type of data they transmit to other nodes.

The present invention achieves temporal awareness by systematically subjecting the distributed system 100 to a large number of possible scenarios. Usually one of the goals in predicting relevant faults is to subject the distributed system 100 to all possible inputs in a way that exercises all code paths at least once. This is greatly complicated by the exponential explosion in the number of possible code paths. In addition, the fact that the distributed system 100 is long-running means that the inputs that it has accumulated over time are large. Given the desire to quickly predict possible faults, existing approaches that replay execution from initial state are therefore not suitable.

The present invention preferably uses four key insights in dealing with the path exploration and large input problems. First, path exploration is started from the current, live state (the shadow snapshot). Doing so eliminates the need to replay long inputs that might be needed to bring a testing executable up and running, and eliminates the possibility of stale configuration files or state. Second, the present invention typically relies on a programmer to identify message handlers and instruments those for path exploration. This enables quick zooming-in on the relevant code. Third, a concolic execution engine is used. The concolic engine allows systematically exploration of paths to achieve full coverage. Fourth, grammar-based whitebox fuzzing is used to help the concolic engine build a large number of random, yet syntactically valid messages. These messages quickly guide execution over the message validation code and enables exploring relevant system behaviour to being sooner than with arbitrary inputs.

Figure 5C:
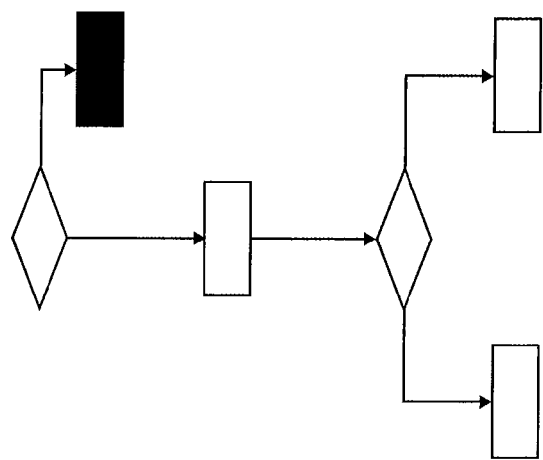
FIGS. 5a-c provide an overview of the manner in which the present invention systematically explores code paths for a message handler.
Figure 5B:
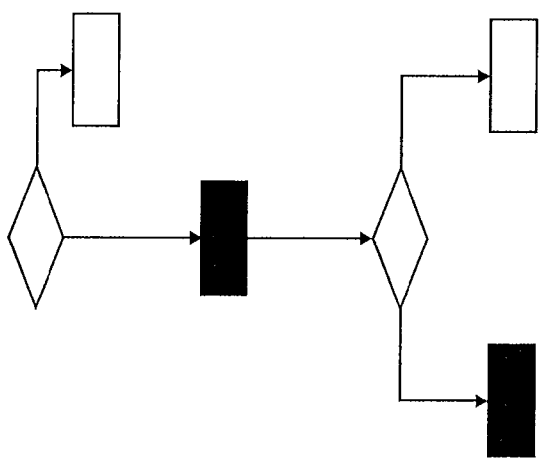
Figure 5A:
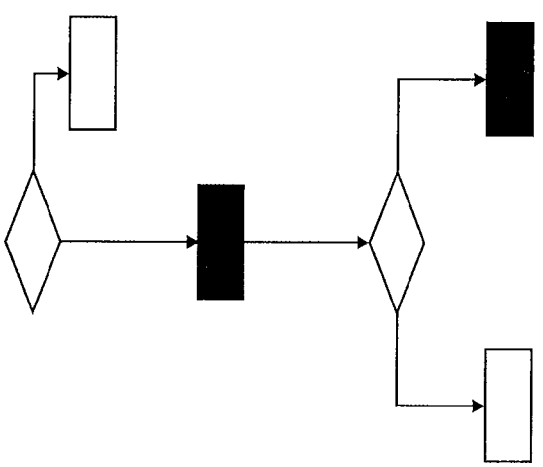

FIGS. 5a-c provide an overview of the manner in which the present invention systematically explores code paths for a message handler (the paths are indicated by the shaded blocks). Each of FIGS. 5a, 5b and 5c depict a flow chart which represent a message handler code (the message handler code form part of the "software code 73" shown in FIG. 3). FIG. 5a shows that the first execution takes place with an arbitrary (e.g., real) input 71. Following this the Oasis path exploration engine 14 then starts controlling the execution and negates one constraint at a time to explore all other paths available in the message handler code (as shown in FIGS. 5b and 5c).

The explorer 10 discovers any faults in the shadow snapshot 63. Preferably, doing so should not leak information, and should give system administrators the ability to control the information that is being transmitted. What could be deemed as tolerable behaviour of one node 10,20 (e.g., resetting a network connection in response to a semantically confusing message), can result in system-wide outage if the offending message is effectively multicast by the nodes 10,20 that are not affected by it before it reaches the susceptible nodes 10,20.

The present invention involves installing a set of properties that capture safety among a set of nodes, or best system practices if the safety invariants are difficult to formulate. For content distribution systems (such as BulletPrime), the safety property captures the agreement of each pair of peers about the bitmap representing the available blocks at the sender. If the safety invariants are difficult to formulate, the properties capture the best system practices, as is the case with BGP. In addition, approaches exist to automatically infer valuable properties in distributed systems.

Once the exploration of the snapshot completes, the controller 13 queries each client node 20 for the status of the properties given its current state. Deciding on the termination of a distributed computation is a well-understood problem, and it can in general be solved by obtaining a consistent snapshot. After collecting the property check results from all clients 20 in the snapshot, the controller 13 produces a warning output for any property that has been violated e.g. . . . for example, if the number of BGP session resets encountered during exploration in a BGP system is above a certain arbitrary threshold.

The properties can be written in a way that reveals little information (i.e., was there a change in the node's state). The nodes can cooperate in this way to predict faults. In some environments, there exist business relationships among the nodes that motivate both the explorer and client to predict faults. Finally, it could be possible to structure property checks as Secure Multi-Party Computation.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method for predicting faults in a distributed heterogeneous IT system, the method comprising:
creating a local checkpoint in an explorer node of said system, said local checkpoint reflecting the state of said explorer node;
running a path exploration engine on said local checkpoint in order to predict faults, wherein a plurality of possible inputs are used by said exploration engine in order to explore different paths, wherein path exploration comprises sending messages to remote client nodes, and receiving messages from said remote clients;
wherein said received messages do not reveal checkpoints of said remote client nodes, so as to avoid leakage of any confidential information.

2. The method of claim 1, further comprising creating a shadow snapshot comprising a collection of checkpoints of multiple nodes with one checkpoint per node, that are consistent with each other.

3. The method of claim 2, further comprising creating a cloned snapshot from said shadow snapshot, and wherein said path exploration is performed by resuming execution in the cloned snapshot.

4. The method of claim 1, wherein said received messages are based on the local exploration of execution paths starting from client checkpoints.

5. The method of claim 1, wherein every node can act as an explorer node.

6. The method of claim 1, wherein a plurality of said nodes are successively used as explorer node.

7. The method of claim 1, wherein said path exploration is executed and communicates with the remote client nodes in isolation from the running environment of said explorer node, so that the fault prediction does not impact the running operation of said explorer node.

8. The method of claim 1, comprising a step of successively providing various sets of inputs to said path exploration engine and exploring paths generated by the various sets of inputs.

9. The method of claim 1, wherein a concolic approach is used for generating concrete inputs used for exploring paths.

10. The method of claim 1, wherein a grammar-based fuzzing approach is used for generating random inputs to said path exploration engine.

11. The method of claim 1, wherein the number of possible node states that are explored is limited in order to reduce computing time, using an heuristic which biases state space exploration toward states that are more likely to expose faults.

12. A method for predicting faults in a distributed heterogeneous IT system, the method comprising:
    creating a shadow snapshot of said system, said shadow snapshot comprising one local checkpoint in an explorer node and at least one client checkpoint in at least one remote client node, each checkpoint reflecting the state of the corresponding node;
    running a path exploration engine based on said local checkpoint of said shadow snapshot in order to predict faults, wherein a plurality of possible inputs are used by said exploration engine in order to explore different paths;
    wherein path exploration comprises sending messages from said explorer node to at least one receiving client node, generating a new predicted state in said client node based on said message and on a client checkpoint of said client node, and sending a reply message from said client node to said explorer nodes, wherein said reply message depends on said predicted state and does not reveal the client checkpoint of said client node.

13. A non-transitory computer program product that tangibly and durably stores program code for carrying out the steps of claim 1 when said program code is executed.

14. A device comprising:
    means for creating a local checkpoint that reflects the current state of the device;
    a path exploration engine to predict faults,
    an input generator for inputting a plurality of possible inputs to said exploration engine in order to explore different paths,
    said path exploration engine being arranged for sending messages to remote client nodes of a distributed heterogeneous IT system, and for receiving messages over shadow connections that do not reveal the client checkpoints of said client shadow snapshots.

15. An appliance comprising:
    a memory space that stores a local checkpoint taken from the current state of the appliance;
    an interface for receiving messages from other remote client nodes of a distributed heterogeneous IT system;
    a path exploration engine arranged for predicting the future state of said appliance, taking into account said local checkpoint and said messages, wherein the received messages do not reveal local checkpoints of said other remote client nodes.

16. A method for predicting faults in a distributed heterogeneous IT system, the method comprising:
    creating a local checkpoint in an explorer node of said system, said local checkpoint reflecting the state of said explorer node;
    running a path exploration engine on said local checkpoint in order to predict faults, wherein a plurality of possible inputs are used by said exploration engine in order to explore different paths, wherein path exploration comprises sending messages to remote client nodes, and receiving messages from said remote clients, wherein said received messages do not reveal checkpoints of said remote client nodes, so as to avoid leakage of any confidential information;
    creating a shadow snapshot comprising a collection of checkpoints of multiple nodes, with one checkpoint per node, that are consistent with each other;
    creating a cloned snapshot from said shadow snapshot, and wherein said path exploration is performed by resuming execution in the cloned snapshot.

17. A method for predicting faults in a distributed heterogeneous IT system, the method comprising:
    creating a local checkpoint in an explorer node of said system, said local checkpoint reflecting the state of said explorer node;
    running a path exploration engine on said local checkpoint in order to predict faults, wherein a plurality of possible inputs are used by said exploration engine in order to explore different paths, wherein path exploration comprises sending messages to remote client nodes, and receiving messages from said remote clients, wherein said received messages do not reveal checkpoints of said remote client nodes, so as to avoid leakage of any confidential information,
    wherein said path exploration is executed and communicates with the remote client nodes in isolation from the running environment of said explorer node, so that the fault prediction does not impact the running operation of said explorer node.

\* \* \* \* \*